J. A. EDEN, Jr.
MACHINE FOR THREADING STAYBOLTS OR THE LIKE.
APPLICATION FILED JAN. 17, 1919.
1,367,951.
Patented Feb. 8, 1921.
6 SHEETS—SHEET 1.
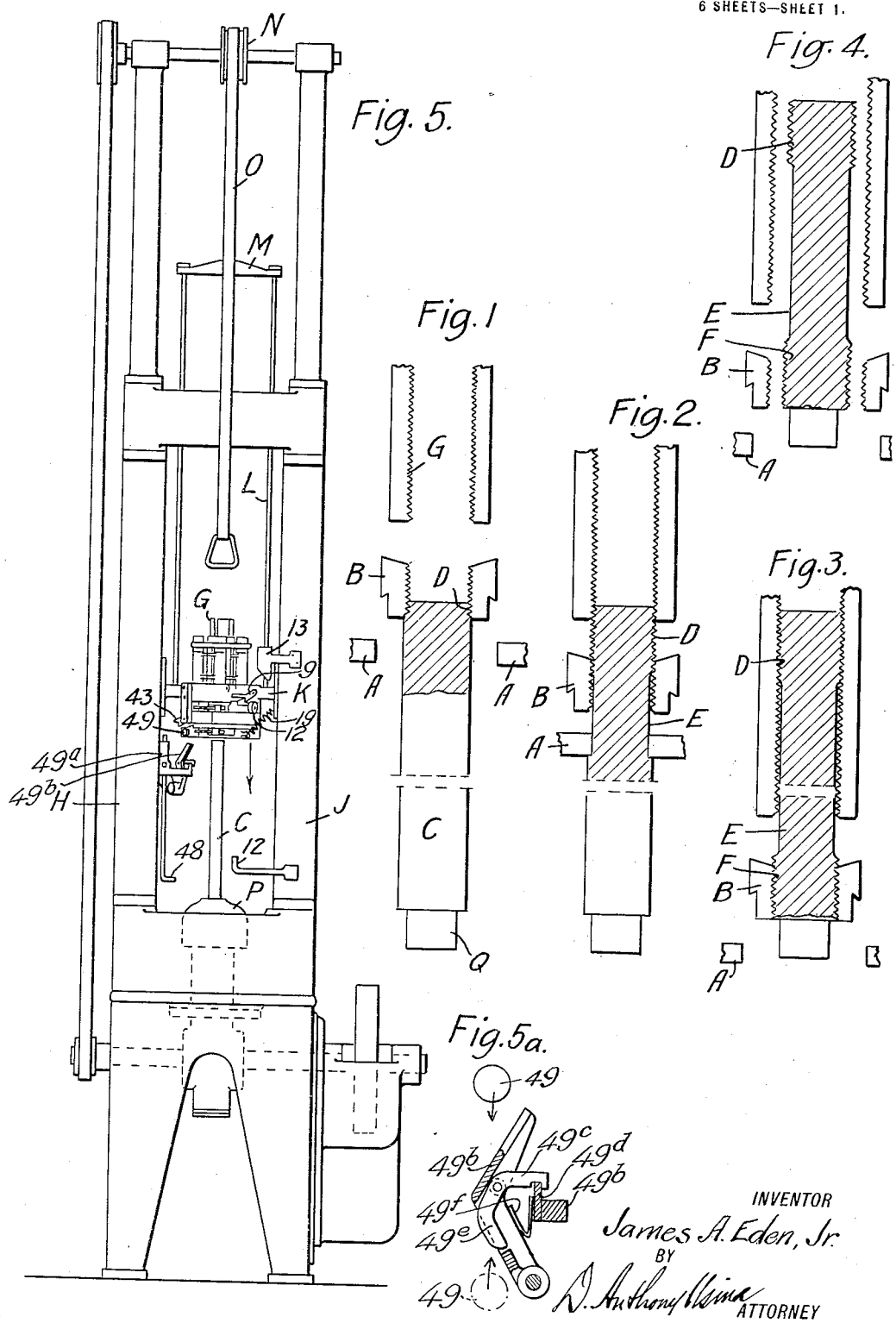
INVENTOR
James A. Eden, Jr.
BY
D. Anthony Usina
ATTORNEY

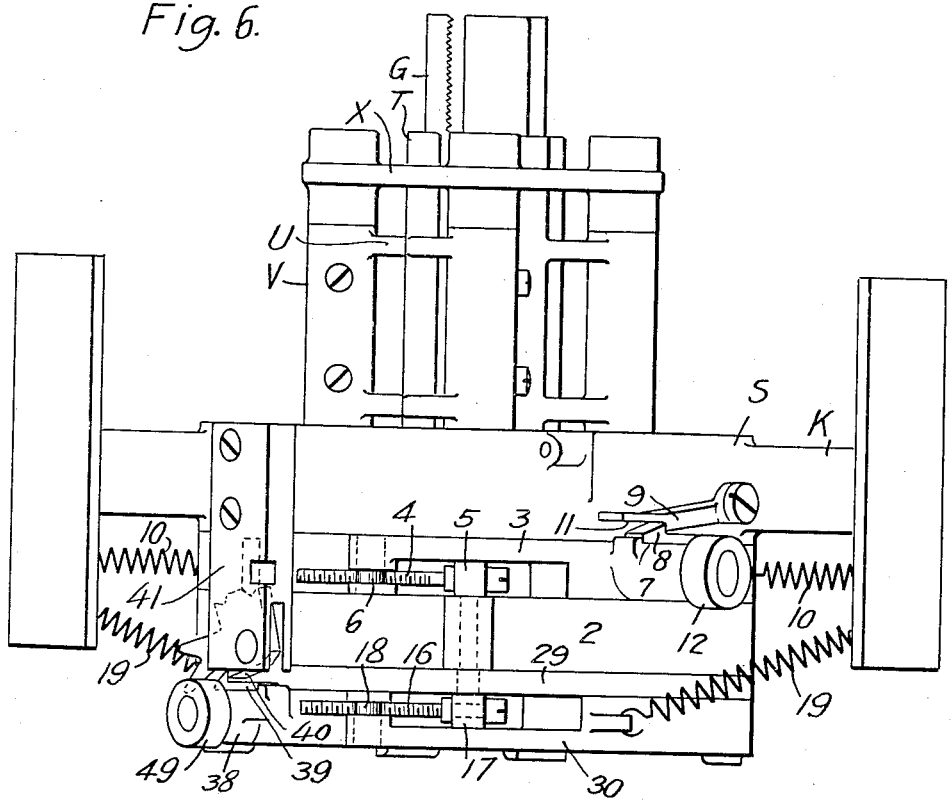
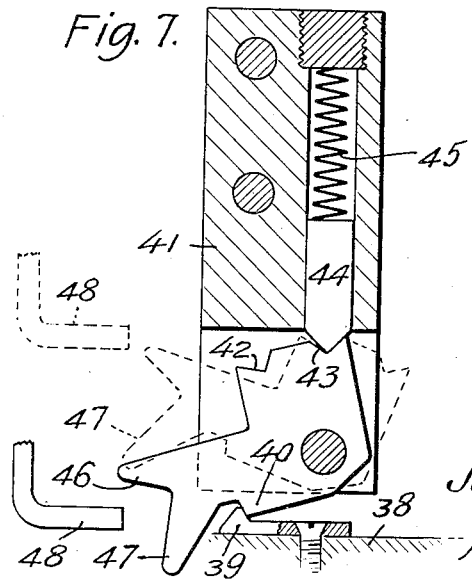
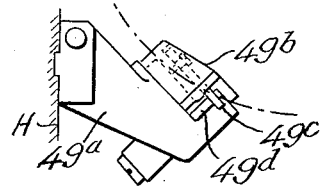

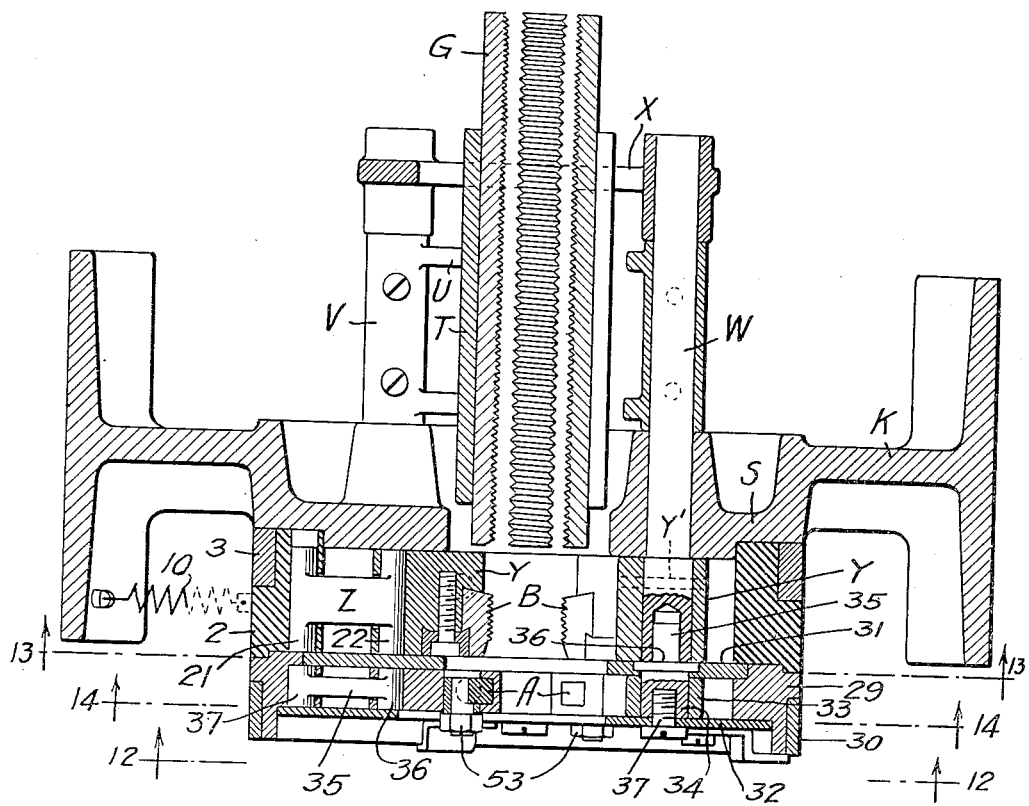
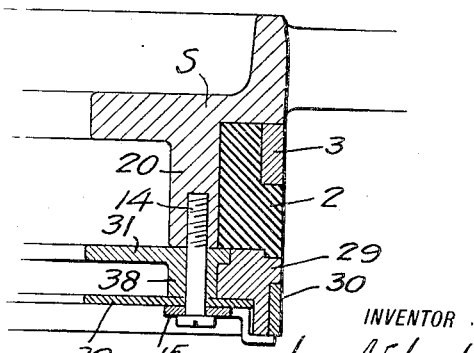

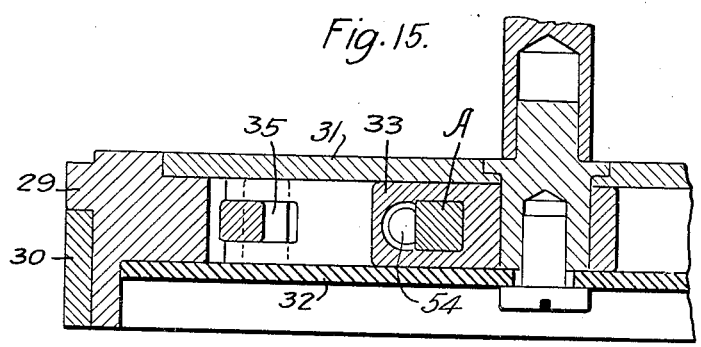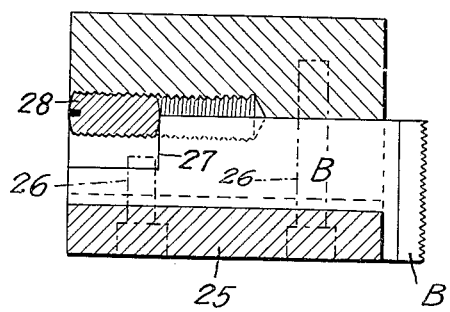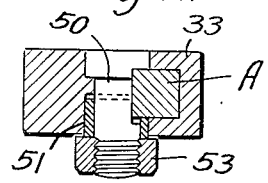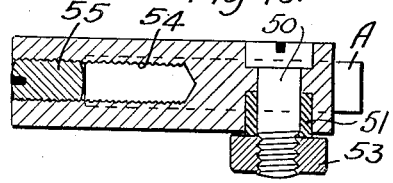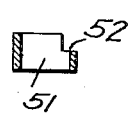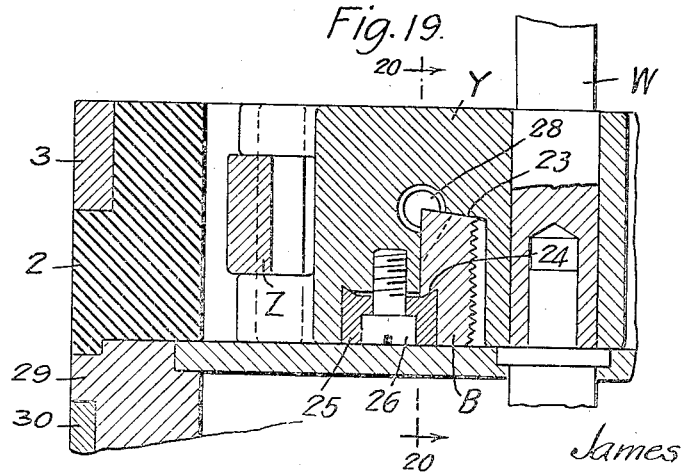

UNITED STATES PATENT OFFICE.

JAMES A. EDEN, JR., OF SPRINGFIELD, MASSACHUSETTS, ASSIGNOR TO WALTER H. FOSTER, OF NEW YORK, N. Y.

MACHINE FOR THREADING STAYBOLTS OR THE LIKE.

1,367,951. Specification of Letters Patent. Patented Feb. 8, 1921.

Application filed January 17, 1919. Serial No. 271,631.

*To all whom it may concern:*

Be it known that I, JAMES A. EDEN, Jr., a citizen of the United States, and a resident of Springfield, Massachusetts, have invented certain new asd useful Improvements in Machines for Threading Staybolts or the like, of which the following is a specification.

In staybolt machines it is common to mount a blank in vertical position with a lower squared end in the socket of a spindle by which the blank is rotated, and to lower a die head onto the upper end of the bolt, which feeds downward thereon by gravity.

My invention is primarily directed to an improved die head for use in this class of work. At the same time it presents features of improvement which are adapted for use in other threading or turning machines and operations.

The accompanying drawings illustrate the improvement applied to a staybolt machine.

Figures 1, 2, 3 and 4 are diagrams showing the positions of the principal parts at successive stages in the forming of a bolt;

Fig. 5 is an elevation of a machine operating with my improved die head; Fig. 5ª being an enlarged detail;

Fig. 6 is a side elevation of the head alone;

Fig. 7 is a detail of a trip carried by the head; Fig. 8 is a plan of a cam;

Fig. 9 is a vertical section of the head, the plane of section being indicated by the broken line 9—9 of Fig. 13;

Fig. 10 is a section on the line 10—10 of Fig. 13;

Fig. 15 is a vertical section on the line 15—15 of Fig. 14;

Figs. 16, 17 and 18 are details of the parts shown in Fig. 15;

Fig. 19 is a section on the plane indicated at 19—19 of Fig. 13;

Fig. 20 is a section on the line 20—20 of Fig. 19.

Figure 11:
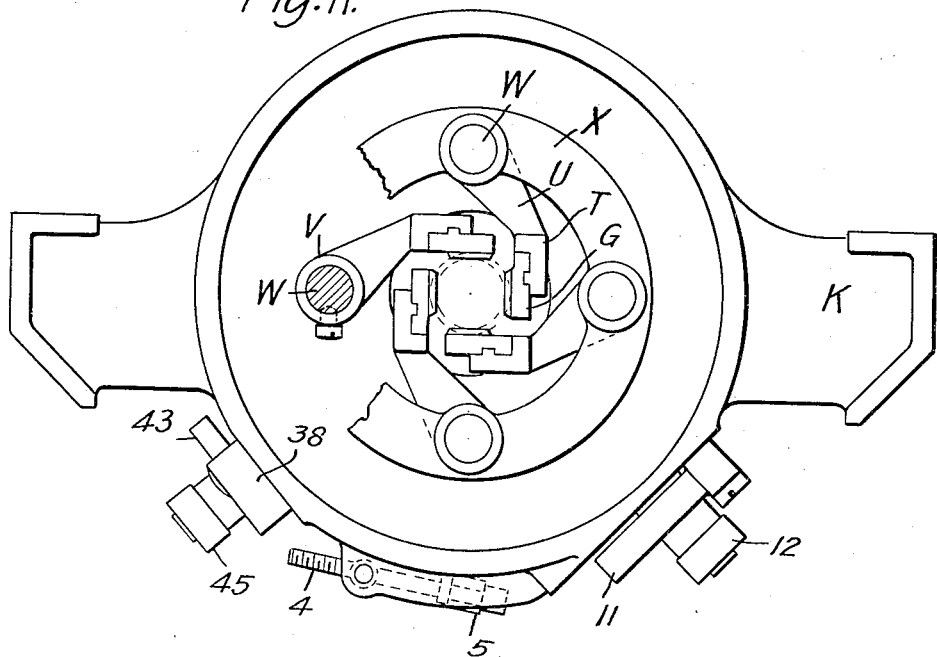
Fig. 11 is a top plan view.
Figure 12:
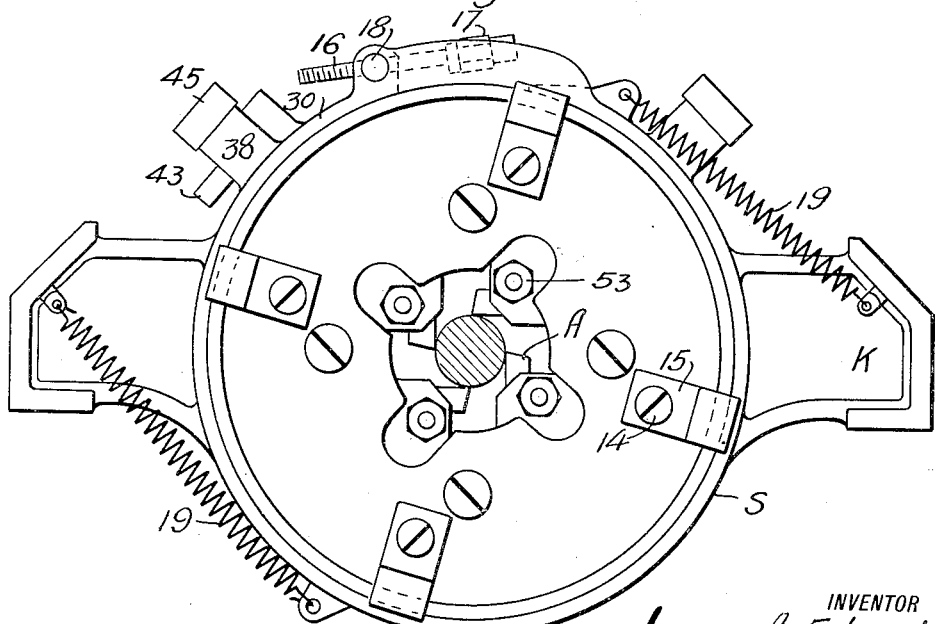
Fig. 12 is an underside plan view of the head, the point of view of the latter being indicated by the line 12—12 of Fig. 9.

Referring to the embodiment of the invention illustrated, a characteristic feature is in the location of the turning cutters and of the threading cutters or chasers. The term "cutter" is used herein to include both turning cutters and chasers. The turning cutters are located below or in advance of the chasers. The vertical distance between them is less than that of the thread on the upper end of the bolt, and the turning of such thread proceeds to a considerable length before the cutters attack the blank.

Referring first to Figs. 1 to 4 the turning cutters A and chasers B, starting at a point above the blank C, are brought to the position of Fig. 1 and lowered onto the upper end of the blank. The blank is turned as usual and this causes the chasers B to cut the thread D on the upper end. At a determined point in the downward movement of the head the cutters A are forced inward as in Fig. 2 so that the chasers continue to cut the thread B while the cutters A reduce the diameter of the blank below the portion on which the thread D is to be cut, this reduced portion being indicated at E. When the turning cutters have formed the reduced portion E of desired length, as indicated in Fig. 3, they are again thrown out and pass freely over the lower part of the bolt, including the head if it be a headed bolt.

As the die head continues to travel downward the chasers B engage the lower part of the blank and cut the second threaded portion F as in Fig. 3.

At the end of this operation the chasers are thrown out as in Fig. 4, the entire die head is lifted to clear the top of the blank, a new blank is inserted and the chasers are contracted again and lowered on the end of the blank as in Fig. 1.

The die head carries at a point above the chasers B a set of segmental nuts G which are fixed in vertical and lateral relation with the several chasers and the threaded parts of which constitute a continuation of the thread on the chasers B. Before the chasers leave the upper end portion D of the blank, the thread which has been formed thereon is engaged by the segmental nuts G which retain their engagement and form a sort of lead nut continuous with the chasers which controls the subsequent operations.

When the cutters A first engage the work their downward feed is positively controlled by the engagement of the chasers with the upper end portion of the blank. And after the chasers pass below such end portion the lead nut formed by the segmental nuts G continues this positive and regular control of the feed of the turning cutters. This insures an even regular operation of the turning cutters and also holds the blank down and firmly in place during the turning operation.

The threading of the portion D of the blank is practically or nearly completed by the chasers B before the cutters A begin to act, effecting considerable economy in power as compared with previous machines where the chasers and the turning cutters have been operated simultaneously throughout the greater part of the work. The present arrangement economizes wear on the chasers since they are used to cut only the end portions of the blank and are idle in passing over the intermediate portion.

The divided feed screw or nut engages the upper thread on the blank before the chasers pass beyond this thread and serve to steady the feed. They also hold their engagement with the upper thread, as shown in Figs. 2 and 3, when the chasers engage the lower end of the blank and regulate the feed throughout the threading of this portion F. This insures that the lower thread shall commence at the right point in the circumference of said portion F and shall be an exact continuation of the upper thread and shall continue with the same pitch as that of the upper thread.

The movements of the turning cutters and chasers are controlled by trips or stops set at fixed points suitably located along the length of the blank according to the desired proportions of the bolt. These stops will be described hereinafter in connection with coöperating parts of the head.

The machine comprises upright guides H, J, Fig. 5, which are engaged by the lateral extensions K of the head, the latter being connected by rods L to a cross-head M which is suspended from a strap running over a pulley N overhead and down as indicated at O with a handle in reach of the operator. The pulley N is constantly rotated in a direction to lift the head and the operator by pulling on the handle causes the strap O to grip the pulley with sufficient force to easily lift the head and permit the insertion of a new blank. On the bed of the machine is a vertical rotating spindle with a block P on its upper end having a squared socket in which rests the lower squared end Q of a blank. Some staybolts are formed with heads commonly called button-heads, and others are headless, but in any case there is a squared portion Q formed for engagement in the block P, which squared portion is usually cut off after the staybolt is screwed into the plates which it is used to fasten together.

As shown in Fig. 9 the central plate S has suspended below it first a ring carrying the threading cutters or chasers and their controlling mechanism and, below this, a ring carrying the turning cutters and their controlling mechanism. The feed nut is supported at a point above the plate S and extends down into the same nearly to the plane of the chasers.

The separate segmental nuts G are mounted, Figs. 11 and 9, in vertical holders T on the ends of arms U mounted on hubs V fastened on shafts W which are journaled at their lower ends in bosses on the plate S and at their upper ends in similar bosses on a ring X which holds them in proper alinement. On the enlarged lower ends of the shafts W are fixed the hubs of the chaser holders Y by means of a pin Y', as indicated in Fig. 9, so that each segment G swings outward or inward with one of the chasers.

Figure 13:
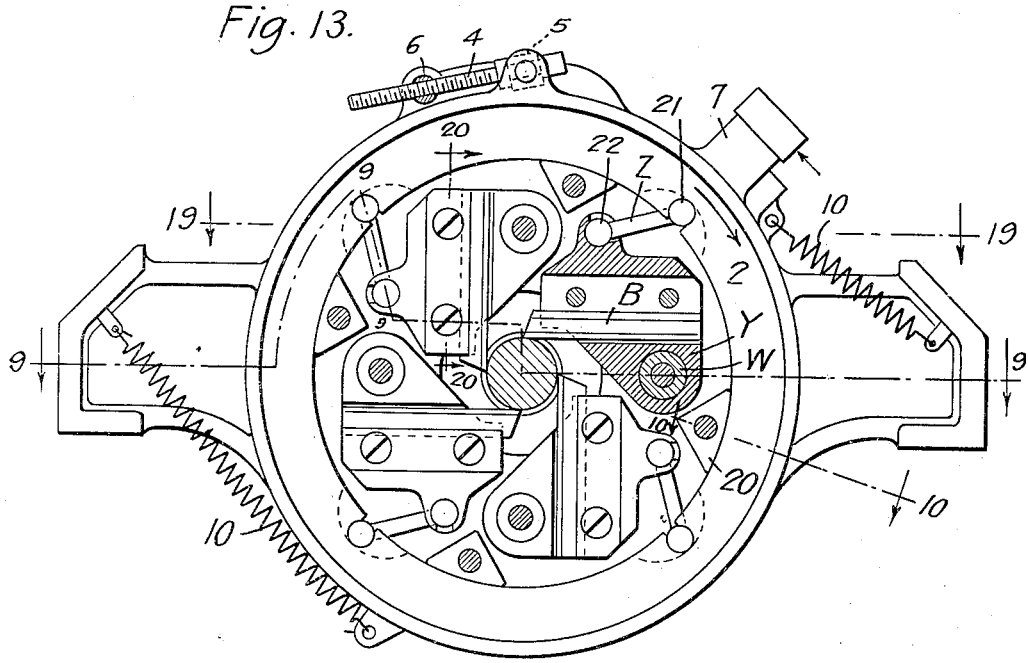
Figs. 13 and 14 are underside plan views, partly in section, of different portions of the head, the plane of view being indicated by the correspondingly numbered lines in Fig. 9.

The chasers B, Fig. 13, are mounted in holders Y, fixed on the shafts W as above explained and arranged to swing inward to engage the work or outward to clear the work when the head is to be lifted. The movement of the holders is effected by means of toggles Z each of which has one end pivotally connected to a holder, their outer ends being all pivotally engaged with a surrounding ring 2 which is adapted to be turned to the right (in Fig. 13) to open the chasers or to the left to close them. The control of the angular position of the ring 2 is effected through a ring 3 which is intermediate between the ring 2 and the main plate S of the head. The rings 2 and 3 are fastened together by means of a screw 4 (Figs. 6 and 13) fixed against longitudinal movement in a block 5 swiveled on the ring 2 and threaded through a block 6 swiveled on the ring 3. The ring 3 moves between fixed limits. By turning the screw 4 the angular position of the ring 2 with respect to the ring 3 and with respect to these fixed limits can be determined so as to adjust the chasers to different diameters of the work.

The ring 3 carries a projection 7 in the upper face of which is a hardened steel stop 8 adapted to engage a shoulder on a pawl 9 which is pivoted on the side of the portion S of the head. A spring 10 is fastened at one end of an eye on the projection 7 and at its opposite end to the elongated portion of the adjacent guide arm K. A similar spring is fastened to the opposite side of the ring 3, and these two springs work together to turn the ring 3 and the ring 2 in a direction to open the chasers. The pawl 9 has an extension 11 which when the head has moved downward to the desired limit will strike a fixed trip 12 (Fig. 5) so that the pawl will be lifted and the springs 10 will turn the rings until the stop 8 strikes the adjacent arm K, which movement will throw the chasers wide open. The head will then be raised. After it passes above the work, a roller 12 on the end of the projection 7 will strike a cam 13 (Fig. 5) mounted on the frame of the machine and the ring will be forced around until the stop 8 is again caught by the pawl 9 which will determine the closed position of the chasers.

The central plate S of the head is provided at intervals with lugs 20 (Figs. 10 and 13) located in the angular spaces between the holders Y and having a common cylindrical outer face which forms a bearing for the ring 2. The ring 3 is mounted in a recess in the outer upper face of the ring 2. This arrangement of bearings is very compact and permits of the making of the head comparatively small and light for a given size of bolts to be formed.

The links Z in the cutting position (Fig. 13) have their bearings substantially in line with the pressure to which they are subjected, that is to say, the opposite bearings of each link are about equidistant from the center of rotation of this holder, so that they take a nearly or substantially straight thrust without side strain on the bearings. Each link Z has elongated ends 21 and 22 which are mounted in recesses in the ring and the holder extending substantially the full length thereof. By making these bearings as long as possible and at least as long as the chasers we secure the most effective resistance to tilting, together with the greatest compactness.

The location of the bearing 21 not only secures the best resistance to the backward thrust, but has an advantage also in permitting a wide opening of the chasers so as to reduce the chance of their striking the bolt when the head is being lifted. This outer bearing 21 is located to the rear of that radius of the head which passes through the bearing 22. And when the ring is retracted to open the chasers the outer bearing 21 moves still farther to the rear. This location of the bearing 21 to the rear of such a radius in all positions gives the maximum amount of opening.

The method of mounting the chasers in their holders Y is shown in detail in Figs. 19 and 20. Each holder is formed on its lower face with a groove having a forwardly and downwardly inclined bottom face 23. The chaser B has its top face correspondingly inclined and has its back cut away at the lower edge with a shoulder 24 inclined forwardly and upwardly. A clamping bar 25 has its upper edges arranged to overhang so that one or the other of these may be brought into engagement with the shoulder 24 of the chaser when the bar is fastened into a suitably shaped recess in the underface of the holder by means of screws 26.

At its rear end the chaser has its upper outer portion cut away to form a shoulder 27 against which bears an adjusting screw 28 which is threaded for something more than half its circumference in the holder Y. When a chaser is worn it can be removed by taking out the clamping block 25 and reground and again inserted to a position determined by the adjustment of the screw 28, and clamped again by the block 25.

Figure 14:
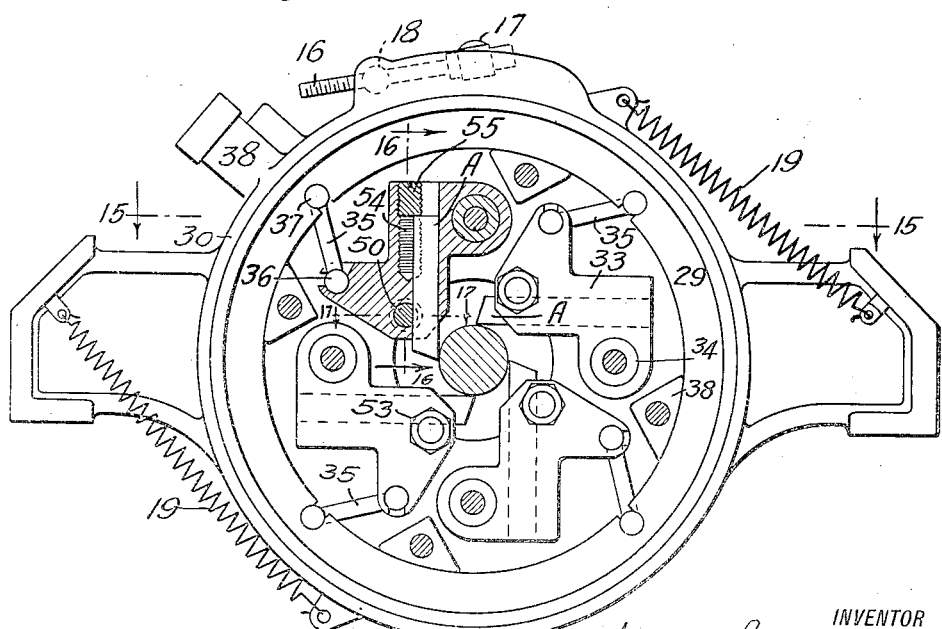

It will be readily understood that the chaser head as above described may be used without turning cutters, merely providing a plate across the lower end of the surrounding ring to hold the parts in place. Preferably however, I mount a similar head carrying turning cutters below such chaser head and this serves the purpose of such a plate. The turning cutter head is mounted in a pair of rings 29 and 30 (serving functions similar to those of the rings 2 and 3 of the chaser head); its upper and lower ends respectively being closed by plates 31 and 32. As shown in Fig. 14 each cutter A is carried in a holder 33 which is mounted to turn on a pivot 34 and is operated through toggles 35 having inner bearings 36 and outer bearings 37 similar in design and location to the toggles Z of the chaser holders. The bearing ends 36 and 37 of these toggles 35 are shorter than those of the chaser toggles and the toggles 35 themselves are lighter, since the strain on them is less. But their angular positions are such as to secure the best direction for resistance to the strains to which they are subjected and the widest opening of the cutters, and their bearings are made longer than the bearing faces of the cutters and in fact of the full length between the end plates 31 and 32.

Each of the pivots 34 for the cutter holders is formed with a reduced upper end 35 entering and turning freely in the bases of the shafts W and with a flange 36 held in a suitable recess in the top plate 31, and the lower ends of these pivots are held by means of screws 37 passing through the bottom plate 32.

The top plate 31 is provided with downwardly projecting lugs 38 similar to the lugs 20 in the chaser head and serving as a firm and compact bearing for the ring 29. The lower plate 32 and the upper plate 31 are fastened to the main plate S of the head by means of screws 14 passing through angle plates 15 which overhang the lower edges of the rings 29 and 30 and which force the plate 32 into holding engagement with the ring 29 and thus hold all the parts firmly together with freedom of rotation for the several rings.

The rotation of the ring 29 in order to open and close the turning cutters is effected by mechanism similar in a general way to that used for the chasers but differing in detail and in the timing of the successive operations. The ring 29 in which the outer bearings of the toggles are carried is connected to the ring 30 by a screw 16 fixed against longitudinal movement in a block 17 swiveled on the ring 29, and threaded through a swiveled block or pin 18 on the adjacent ring 30; so that the angular position of the ring 29 may be adjusted with relation to the ring 30 which oscillates between set limits. Springs 19 pull the rings around in a direction to open the cutters. A projection 38 on the ring 30 carries a hardened steel stop 39 (see especially Fig. 7) adapted to engage a pawl 40 which is pivoted on a bracket 41 attached to and depending from the central plate S of the head. The pawl has at its upper end a pair of notches 42 and 43 adapted for engagement by a pin 44 which is pressed down by a spring 45 carried in a bracket so that the pin will lock the pawl impositively in either the operative position shown in full lines, or in the inoperative position shown in dotted lines. The pawl has an outer forked end with arms 46 and 47 engaging a stop 48 fixed on the frame of the machine to secure the releasing of the turning cutters at the desired point in the length of the blank. The projection 38 carries a roller 49 for engagement by a cam to close the cutters against the opening pull of the springs 19.

Fig. 7 shows the ring locked in position to hold the turning cutters closed and therefore represents the operation when they are turning the reduced shank of the bolt. Near the end of the downward movement of the head the arm 46 of the pawl strikes the fixed stop 48 (Figs. 5 and 7 and is thrown up to the dotted position and held there by the locking pin 44; releasing the stop 39 and allowing the springs to open the cutters and to hold them open throughout the remainder of the downward stroke, the relative position of the stop 48 after such opening being indicated in dotted lines in Fig. 7. Then as the head is raised the arm 47 of the pawl, being in the dotted line position, will strike the stop 48 and the pawl will be restored to its operative position. The ring will still be held in the opening position, but the pawl 40 will be ready for action.

The stop 48 is fastened by a set screw, to permit vertical adjustment, in a bracket 49$^a$ (Fig. 5) which also carries a pivoted cam 49$^b$ located near the upper end of the path of the head. See also Figs. 5$^a$ and 8. The cam is held rigidly by a pivoted latch 49$^c$ having a notch which engages a plate 49$^d$ on the bracket and which is operated by a tail 49$^e$. The roller 49 in its upward movement strikes the tail of the latch and lifts the latter, the pawl yielding to permit the roller to pass up above it and being then restored by its spring 49$^f$ to the locked position. On the downward movement of the head the roller 45 will ride over the locked cam which will thus throw the roller and the ring 30 around until this stop 39 catches under the pawl 40; throwing the turning cutters in at the point where the reduced portion E of the bolt is to begin.

The turning cutters A are square and are mounted in their holders 33 in the manner shown in detail in Figs. 15 to 18. Each cutter is located in a square hole which passes through the holder and is clamped near its forward end and adjusted by a screw at its rear end. The clamping means is shown in Fig. 17. A bolt 50 passes through the holder from top to bottom and is notched at its side to embrace one side of the cutter. A sleeve 51 surrounds the lower part of the bolt and has a shoulder 52 engaging the underface of the cutter. The sleeve 51 is pressed against the cutter by a nut 53 on the end of the bolt, so that the cutter is clamped between this sleeve and the head of the bolt. At the rear and slightly offset from the hole which carries the cutter is a threaded opening 54 (Figs. 14 and 16) in which an adjusting screw 55 is engaged for more than half its circumference, said screw bearing on a portion of its inner end against the rear end of the cutter A. When a cutter is worn it is unclamped and withdrawn and reground and is then reinserted and adjusted by this screw 55 and clamped again by the nut 53.

For convenience in adjusting these cutters and also the chasers the rings surrounding them may be provided with openings in proper alinement to permit the introduction of screw drivers to engage the ends of the adjusting screws.

The improved head described is adjustable for a wide range of diameters of bolts. One set of chasers may be used for all sizes of bolts within this range having the same number of threads per inch. The simplicity and compactness of the construction makes it possible to use four turning tools within a small head, correspondingly dividing the cut. The head carrying the turning cutters is self contained and attachable to or detachable from the head carrying the chasers. The use of fixed controlling devices (the stop and the cam) makes it possible to adjust the machine for any length of reduced shank desired on the bolt, by suitably placing these controlling devices.

The unit carrying the turning cutters being removed, the chaser head may be used for threading blanks which have been forged or upset to form the two enlarged ends with a reduced central portion. In this case the lead nut insures that the second thread formed will be continuous with the first, that it will start at the right angular point around the circumference of the bolt and will maintain the same pitch as the upper thread.

Some or all of the improved features presented may be applied in various other threading or turning machines, such for example, as the type in which the heads are arranged in two halves hinged together so that they open and shut as a whole, each half containing one or more of the blades (chasers or turning cutters) fastened and adjusted as described above. These improvements may be applied also to the type of threading machines in which the opening and closing of the cutters is effected by hand, either the closed heads or the split heads above referred to. They may be applied also to machines for threading or forming other styles of bolts and operating upon blanks either in vertical or in other positions and in which either the blank or the tools are rotated. In fact the improvements are applicable to a great variety of types of apparatus. And though I have described with great particularity of detail a specific embodiment of my invention, yet it is not to be understood therefrom that the invention is restricted to the embodiment illustrated. Various modifications and adaptations of the invention may be made by those skilled in the art without departing from the invention as defined in the following claims.

What I claim is:—

1. A staybolt machine including turning cutters for reducing a portion of the bolt and threading cutters for forming threads on opposite ends of the bolt and means engaging one of said threads and serving as a lead nut for said threading cutters in the forming of the other of said threads.

2. Means for cutting threads on opposite ends of a staybolt or the like including a die adapted to cut first one and then the other of said threads and leading means adapted to engage the first thread before said die leaves the same and to remain in engagement therewith until said die commences the cutting of the second thread.

3. A staybolt machine including threading cutters and turning cutters and means engaging a thread in the rear of the turning cutters for controlling their feed.

4. A staybolt machine including threading cutters and turning cutters for turning the blank to a diameter less than that of the threads, the latter operating in advance of the former, and means for initiating and terminating the operation of the turning cutters at determined points in the length of the work.

5. A staybolt machine including threading cutters and turning cutters and means for first operating said threading cutters to thread the near end of the bolt, then operating said turning cutters to reduce the intermediate portion in advance of said threading cutters and then operating said threading cutters to thread the farther end of the bolt.

6. A staybolt machine including a threading die and a turning die, controlling devices for holding the threading cutters in engagement over a part of the blank and controlling devices for holding the turning cutters in engagement over another part, said dies and controlling devices being so spaced with relation to each other that each die is caused to operate only on a separate part of the blank from that operated on by the other.

7. A staybolt machine including a longitudinally movable head carrying expansible and contractible turning cutters and a threading die in the rear of said cutters, means for holding said cutters expanded while they pass over the end of the blank and then contracting them to turn the same and means for regulating the longitudinal movement of the head after the die has threaded the said end of the blank.

8. A staybolt machine including a longitudinally movable head carrying expansible and contractible turning cutters and a threading die in the rear of said cutters, means for holding said cutters expanded while they pass over the end of the blank and then contracting them to turn the same and means for expanding said cutters to permit them to pass over the farther end of the blank, so that they will leave enlarged ends on the blank to be threaded by said die.

9. A staybolt machine including a longitudinally movable head carrying expansible and contractible turning cutters and a threading die in the rear of said cutters, means for holding said cutters expanded while they pass over the end of the blank and then contracting them to turn the same and means for expanding said cutters to permit them to pass over the farther end of the blank, so that they will leave enlarged ends on the blank to be threaded by said die and means for regulating the longitudinal movement of the head after the die has threaded the first end of the blank and at least until it comes into engagement with the farther end.

10. A staybolt machine including a longitudinally movable head carrying expansible and contractible turning cutters and a threading die in the rear of said cutters, means for rotating the blank while feeding said head and means for expanding and contracting said cutters and die at suitable points along the length of the blank.

11. A cutter head including cutter holders, a plate overlying them, a ring surrounding said holders and adapted by a turning movement to expand or contract them, and extensions on said plate, on which extensions said ring has a bearing.

12. A cutter head including cutter holders, a plate overlying them, a ring surrounding them and adapted to expand or contract them and lugs extending from the face of said plate between said holders and constituting a bearing for said ring.

13. A cutter head including pivoted cutter holders, a turning ring surrounding the same and toggle links for transmitting the movement of said ring to said holders, each link having its opposite end bearings substantially in the line of pressure.

14. A cutter head including cutter holders, a turning ring surrounding the same and toggle links for transmitting the movement of said links to said holders, said links having their end bearings at least as long as the cutting edges of the cutters.

15. A cutter head including pivoted cutter holders and plates engaging the top and bottom faces of said holders to prevent tilting of the same.

16. A cutter head including cutter holders and trunnions therefor extending from one to the other of the opposite faces of the holders.

17. A cutter head including pivoted cutter holders, a turning ring surrounding the same and toggle links for transmitting the movement of said ring to said holders, said toggles having their outer ends located to the rear of the radii of the head passing through their inner ends in all positions of the toggles so as to secure a wide opening when the toggles are drawn back.

18. A cutter head including pivoted cutter holders, a turning ring surrounding the same and toggle links for transmitting the movement of said ring to said holders, said toggle links lying, in the closing position, out of the lines of reaction of the work on the cutters so that said toggles and the pivots of the holders together bear the strain of such reaction.

19. A staybolt machine including a cutter head adapted to be advanced and retracted, means for expanding the cutters at the end of a cutting operation on the advance and means for contracting the cutters at a determined point after the beginning of the next advance movement and separate means for holding them in the contracted position.

20. A staybolt machine including a cutter head adapted to be advanced and retracted, a turning ring for expanding and contracting the cutters, a spring for turning it in the expanding direction, a latch for holding it in the contracting position, means for withdrawing said latch at the end of a cutting operation and a cam adapted to yield on the retracting movement of the head and adapted on the advancing movement thereof to throw the ring to the contracting position in engagement with said latch.

In witness whereof, I have hereunto signed my name.

JAMES A. EDEN, Jr.